O. SMITH.
DEMOUNTABLE RIM.
APPLICATION FILED JUNE 30, 1919.

1,345,269.

Patented June 29, 1920.
2 SHEETS—SHEET 1.

INVENTOR.
Oscar Smith.
by Lacey & Lacey,
ATTORNEYS.

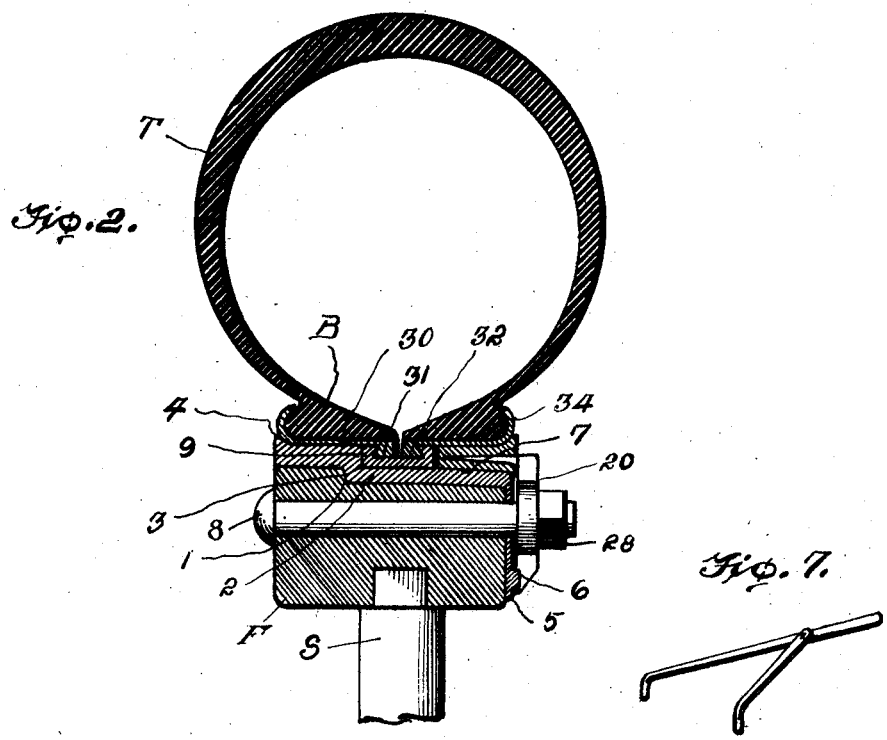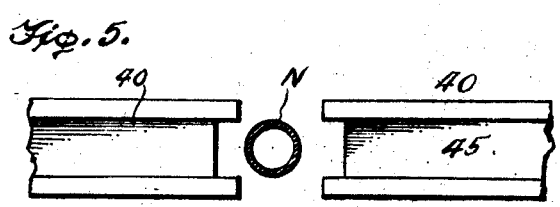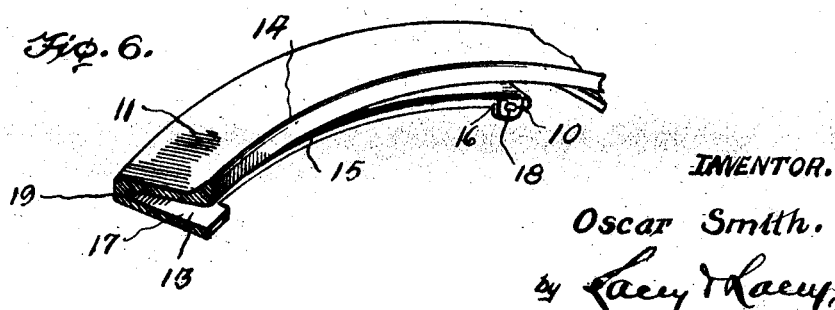

UNITED STATES PATENT OFFICE.

OSCAR SMITH, OF SPRINGFIELD, TENNESSEE.

DEMOUNTABLE RIM.

1,345,269.  Specification of Letters Patent.  Patented June 29, 1920.

Application filed June 30, 1919. Serial No. 307,496.

*To all whom it may concern:*

Be it known that I, OSCAR SMITH, a citizen of the United States, residing at Springfield, in the county of Robertson and State of Tennessee, have invented certain new and useful Improvements in Demountable Rims, of which the following is a specification.

This invention relates to motor vehicle wheels and tires, and more especially to a demountable rim for ready application to the tire and then to the wheel; and the general object of the same is to improve the construction of such devices.

Specifically the invention makes the rim in two parts connected with each other and held on the tire by a locking ring which is split, and use is made of the nipple on the inner tube to hold the ends of this split ring in place and therefore to hold its entire body in place so that it locks the parts of the rim upon the tire. Features of improvement also lie in the formation of the wheel band to accommodate this rim and its locking ring, and in the use of an improved form of wedge ring for holding the parts in place, and also of improved means for holding the wedge ring in position. Details are set forth in the following specification and claims, and reference is made to the drawings wherein:

Fig. 2 is a transverse section through the upper portion of such wheel.

Fig. 6 is a perspective detail of a portion of the wedge ring.

Fig. 7 is a perspective view of a tool which may well be employed in connection with this invention.

Figure 1:
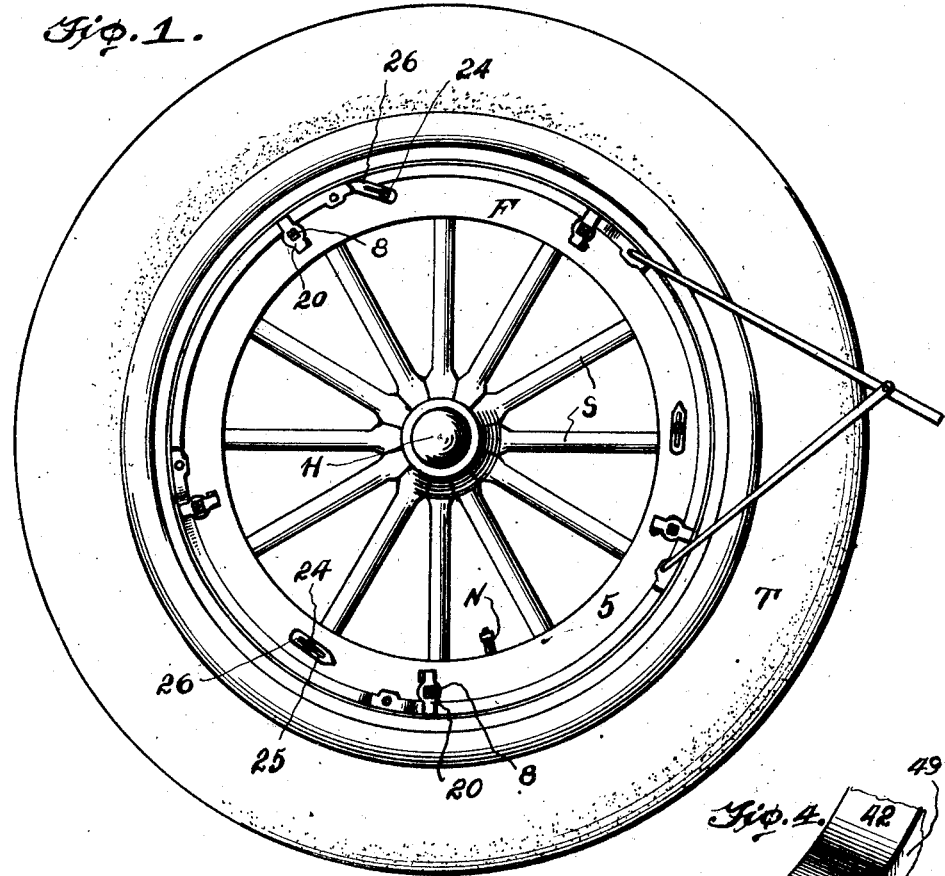
Figure 1 is a side elevation of a complete wheel equipped with this invention.

The wheel here illustrated includes a hub H, spokes S, and a wooden felly F, and the letter T designates the casing of a pneumatic tire having the usual beads B along its edges. This casing is to receive an inner tube, not shown, and the letter N designates the nipple for inflating such tube. To the standard parts of a motor vehicle wheel and its pneumatic tire as thus described in outline, the present invention is designed to be applied.

The outer face of the felly is by preference shouldered as at 1, the shoulder standing near what will be the inside of the wheel or that side next the car, and facing toward the outside. Overlying the felly is a wheel band whose body 2 closely conforms with the face of the felly and has an inside shoulder 3 abutting said shoulder 1, at what will be the inner edge of said band next the car, its edge is by preference radially beaded as at 4 to embrace the flange on the two-part rim yet to be described, along what will be the outer edge of said band, it is provided with a wide flange 5 overlying the outer edge of the felly F and having lugs 6 at intervals for a purpose yet to appear, and the radial outer face of the body 2 along that edge near the flange is inclined as indicated at 7 for the reception of the wedge ring yet to be described. Bolts 8 may pass transversely through the felly and the flange 5 for holding the band in place, and said bolts are further utilized in this construction as will be described below.

Surrounding the inclined face 7 of said band is the wedge ring best seen in Fig. 6. It comprises an inner leaf 17, and an outer leaf 11 connected with the inner leaf either integrally as shown at 19 in this view, or otherwise if said leaves should be of separate pieces of material, and the edge of the outer leaf has a bead 14 corresponding with the beaded edge 4 of the wheel band and for a similar purpose as will appear. These leaves are spaced as shown at 13, and the bevel of the inner face on the inner leaf 17 corresponds with the inclination of the face 7 of the wheel band. The inner edge 19 opposes an outside shoulder 9 on the wheel band, and these elements together with the face of the band between them produce a channel when the wedge is in place, which channel has its use as set forth below. That edge of the inner leaf which will stand at the outside of the wheel adjacent the beaded edge 14 is cut with a number of inclinations or cams 15, each terminating at its higher end in a shoulder 16, and the material of this leaf adjacent the shoulder is bent into a lip 10 pierced with an eye or depression 18.

While any suitable means may be employed to hold the wedge ring in place, I prefer to use buttons 20 mounted on the threaded ends of the bolts 8 as seen in Fig. 1, with their inner ends when in operative position resting against the lugs 6 and their outer ends resting against the cam edges or inclines 15 of the wedge. It will be clear that when the nut 28 on any bolt is loosened and the button turned aside, the wedge can be drawn off the wheel. When the wedge is applied the low ends of the cams 15 should be placed adjacent the buttons and the latter turned to radial position as seen in Fig. 1 and the nuts 28 set up reasonably tight, then the wedge ring should be rotated to bring the higher portions of the cams behind the buttons, and finally the nuts 28 should be tightened. Less this be not sufficient to always reliably hold the wedge, use may also be made of latches 26, each having a slotted body 25 mounted on a bolt 24 outstanding from the flange 5 and held there by the nut on said bolt; and it may be well to employ a number of these latches around the felly relatively so disposed that first one and then another will come into position as the wedge is turned to engage the shoulder 16 at the high end of the same cam 15. In Fig. 1 the uppermost latch is illustrated in active position, and the others as idle. The tool illustrated in detail in Fig. 7 has a straight shank with a hooked end, and an arm pivoted to the shank and also having a hooked end, and the arm can be swung from the shank so that the hooks may be entered into two of the eyes 18 as indicated roughly in dotted lines in Fig. 1, and then the handle end of the tool moved to turn the wedge ring in either direction.

Such is the structure of the parts carried by the wheel which coact with the rim proper, it being understood that the tire is mounted on the rim and may be inflated before its application to the wheel. In fact, an extra tire and its rim are now commonly provided. The rim proper is made in two companion parts which will preferably have the sectional shape best seen in Fig. 2. Each has a comparatively flat body 30, that of one member overlying the thickest portion of the wheel band and resting against the beaded edge 4 thereof, and the body of the other member overlying the outer leaf 11 of the wedge and resting against its beaded edge 14. Each member also has its outer edge beaded or flanged as at 34, the shape of the flange being appropriate to the bead B on the tire T. At its other edge each member also has on its radially inner side a rib 31 flared along its outer edge as at 32 so that these two ribs collectively produce a single dove-tailed rib at the radially inner side of the rim when its parts are in place on the tire. In the meeting inner edges of the members at an appropriate point are notches through which the nipple N projects.

Figure 4:
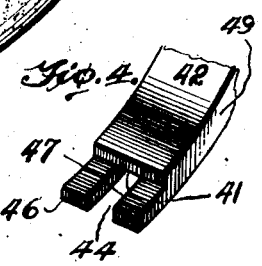
Figure 3:
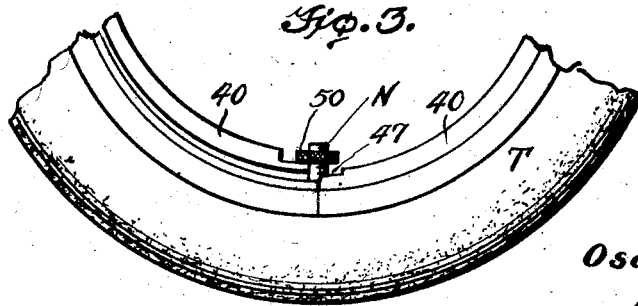
Fig. 3 is a detail showing the manner of fastening the split ring to the rim, Fig. 4 a perspective detail of one end of said ring, and Fig. 5 an outside elevation of the meeting ends thereof.

The locking ring for holding said members together is made in the form of a split ring. Its inner face 42 is flat, its side edges 49 are also preferably flat, one edge resting against the shoulder 9 and the other edge against the inner edge 19 of the wedge, so that when in place this locking ring fills the channel around the wheel band referred to above. The radially outer face of this ring has a dove-tailed channel 41 within which the ribs 31 of the rim members are locked. Where the two end portions 40 of this split locking ring come together, they are notched in their extremities as indicated at 44 in Fig. 4 or at 45 in Fig. 5, the specific shape of the notch being immaterial so long as the two notches collectively will inclose the nipple N. Said notches produce fingers 46, and these fingers are cut away at the radially inner side of the ring as shown at 47 back to a shoulder 48 at the extremity of the inner face 42. Or, to state it differently, each end 40 of the split ring is forked, and the arms of the fork are flattened or reduced in thickness. Now when this ring is put in place, a nut 50 may be run onto the nipple N as shown in Fig. 3, and it will bear on the inner faces 49 of the fingers 46 so that all the fingers will be held in strict alinement and the nut will occupy a space equal to the depth of the shoulder 48.

In applying this improved rim to a tire, the two members have their flanges 34 engaged with its beads, the notches in their inner edges embracing the nipple N of the inner tube which at this time lies deflated within the casing. Now the locking ring is brought into use, its ends 40 sprung a little out of alinement, the notch 44 in one end placed astride the nipple and the channel 41 adjacent this end over the two ribs 31 on the rim-members. The locking ring is carefully held at this end and its body placed over said rib all the way around within the tire, and finally the notch 44 at the other end is pressed down astride the nipple N on its other side. The nut 50 is now applied and tightened up and this holds the locking ring in place, while the locking ring holds the members of the rim in place on the casing; and the inner tube is inflated by applying a pump to the protruding end of the nipple. In this condition the tire and rim are brought to the wheel and placed upon it. The inner face 42 of the split ring passes readily over the inclined face 7 of the wheel band and finally reaches the position shown in Fig. 2 where it rests against the shoulder 9, the flange 34 on one of the rim members now resting against the beaded edge 4. Next the wedge ring is applied in the manner already described, and when tightened up its beaded edge 14 rests against the other rim member while its inner edge 19 rests against the opposite edge 49 of the locking ring. The wedge ring is held after adjustment by one or both of the means already described. The motorist now proceeds on his way, and, should an accident occur requiring the removal of a tire and rim, he has but to disengage the fastening devices from the wedge ring, apply the tool thereto and turn it in a direction which will bring the low ends of its cams 15 behind the buttons 20, then turn the latter aside and pull the entire wedge out of place. This of course leaves the rim and its injured and perhaps deflated tire entirely free to be slipped off the wheel band and repaired or replaced by another. To remove the tire casing from the rim, the nut 50 will be removed so that one end 40 of the locking ring can be slipped entirely off the nipple, after which first this end and then the remainder of the body of this ring can be disengaged from the dove-tailed rib formed by the two rim-members, and as soon as the locking ring is removed these members may be readily taken off of the tire casing.

Such is the construction of the parts which remain on the wheel and the parts which carry the tire, but it is obvious that changes in the details of either part might be made. The two-part rim whose members are connected by a channeled split ring might be mounted on a wheel band of considerably different construction on its face, and held by a so-called wedge ring also of considerably different construction, provided that the parts in one group were shaped to fit the parts in the other. It is also obvious that the means for holding the wedge ring in place may be widely modified if desired. It is preferred that the wedge ring be V-shaped with some resiliency between its wings, but even this is not necessary as a solid ring might answer. The inclined face 7 on the wheel band permits the ready insertion and removal of the locking ring, but the latter might bind upon or fit rather tightly around the seat on said band next its shoulder 9, although it is quite possible that the inclination at 7 could be carried clear through the seat to the shoulder 9. In the preferred construction illustrated, however, the tire and rim could be put onto the wheel with either side adjacent the car, or in other words, the demountable elements are reversible.

Having thus described the invention, what is claimed as new is:

1. The combination with a rim having means for holding a tire on its outer face and an annular rib on its inner face between its edges; of a felly having in its outer face near one edge a shoulder facing toward the other edge, a wheel band surrounding said face and having an inside shoulder abutting that on the felly and an outside shoulder facing away from its inside shoulder toward the opposite edge of the band, a wedge ring surrounding the last-named portion of the band, the inner edge of said ring and said outside shoulder and the face of the band between them constituting a channel adapted to receive said rib, bolts through the felly, and buttons rotatably mounted on the bolts beneath their nuts and adapted in one position to hold the wedge ring in place or in another position to permit the wedge ring to be removed.

2. The combination with a rim having means for holding a tire on its outer face and an annular rib in its inner face between its edge; of a wheel band adapted to be secured around the felly and having an outside shoulder near one edge facing toward the other edge, the face of the band near the last-named edge being inclined, a V-shaped wedge ring whose outer leaf is shaped to fit said rim and whose inner leaf is inclined to match the incline on said band, the edge of the inner leaf being formed with cams, and buttons pivotally mounted at the side of the felly and adapted in one position to overlie said cams and permit the turning of the wedge ring or to be tightened up against such cam, or in the other position to permit the removal of the wedge ring.

3. The combination with a rim having means on its outer face for carrying a tire, a wheel band having a body adapted to be secured around a felly and beaded along one edge to engage one edge of said rim, its other edge having a flange adapted to pass along the edge of said felly, this flange being provided on its outer face at intervals with lugs, and bolts through the felly and flange at points adjacent said lugs; of a wedge ring shaped for insertion between said band and rim and having cams on that edge adjacent the band-flange, the ring being also beaded to engage the opposite edge of the rim, and a button rotatably mounted on each bolt with one end adapted to be turned against one of said lugs and its other end at this time to overlie one of said cams, as described.

4. The combination with a rim having means on its outer face for carrying a tire, a wheel band having a body adapted to be secured around a felly, its edge having a flange adapted to pass along the edge of said felly, this flange being provided on its outer face at intervals with lugs, and bolts through the felly and flange at points adjacent said lugs; of a wedge ring shaped for insertion between said band and rim and having cams on that edge adjacent the band-flange, buttons mounted on said bolts and adapted each to engage a cam and a lug, and latches adjustably mounted on said band-flange and each adapted for engagement with the shoulder at the high end of a cam when the wedge ring is adjusted to permit.

5. The combination with a band adapted to be arranged about a felly and having an annular shoulder on its outer side, of a rim arranged about said band and having an annular rib engaged with said annular shoulder, and an annular wedge disposed between said rim and said band and including inner and outer leaves, the outer leaf of said wedge being provided with an annular rim engaging bead.

In testimony whereof I affix my signature.

OSCAR SMITH. [L. S.]